United States Patent [19]

Nagaoka et al.

[11] 3,824,837
[45] July 23, 1974

[54] METHOD OF RAPIDLY DETERMINING THE SOLIDUS LINE OF MOLTEN STEEL

[75] Inventors: Noriyoshi Nagaoka; Genichi Usui, both of Kawasaki, Japan

[73] Assignee: Nippon Kokan Kabushiki Kaisha, Tokyo, Japan

[22] Filed: Sept. 15, 1971

[21] Appl. No.: 180,883

Related U.S. Application Data

[63] Continuation-in-part of Ser. No. 880,338, Nov. 26, 1969, abandoned.

[30] Foreign Application Priority Data

Nov. 30, 1968 Japan.............................. 43-87309

[52] U.S. Cl. ............................ 73/17 R, 73/DIG. 9
[51] Int. Cl. ............................................. G01n 25/04
[58] Field of Search .......... 73/17, 354, 359, DIG. 9; 75/129, 130

[56] References Cited
UNITED STATES PATENTS

| | | | |
|---|---|---|---|
| 3,267,732 | 8/1966 | Hance................................... | 73/359 |
| 3,321,973 | 5/1967 | Anderson.............................. | 73/359 |
| 3,375,106 | 3/1968 | McKissick et al. ................... | 75/129 |
| 3,463,005 | 8/1969 | Hance................................... | 73/354 |
| 3,546,921 | 12/1970 | Bourke et al. .......................... | 73/17 |
| 3,559,452 | 2/1971 | Perbix et al............................ | 73/17 |
| 3,685,359 | 8/1972 | Boron et al. ............................ | 73/17 |

Primary Examiner—Herbert Goldstein
Attorney, Agent, or Firm—Steinberg & Blake

[57] ABSTRACT

A method for the rapid determination of the solidus line of molten steel, from which the carbon content of the steel can be determined. First there is placed in a chamber of a measuring unit a predetermined quantity of metallic bodies which have the property of melting in molten steel so as to cool the latter without causing any heat-producing reaction so that the bodies act only to cool the molten steel by being absorbed into the latter causing the temperature of the molten steel to fall. The quantity of bodies placed in the chamber is determined in accordance with the temperature of a bath from which molten steel is subsequently taken and in accordance with the amount of these metal bodies required to bring about complete melting of the melting bodies in the molten steel when the latter has nearly reached the solidification temperature, and the amount of cooling agent formed by these bodies being sufficient to bring about a rapid cooling of the molten steel. With these bodies thus situated in the chamber molten steel is then delivered thereto so as to be rapidly cooled by the cooling agent formed by the bodies down to a temperature which is nearly the solidification temperature of the molten steel, and then the latter is permitted to cool naturally to the solidification temperature. During the cooling of the molten steel in the chamber of the measuring unit, the temperature of the molten steel is constantly measured and recorded to provide a curve where the point of solidification is sharply and clearly apparent.

6 Claims, 6 Drawing Figures

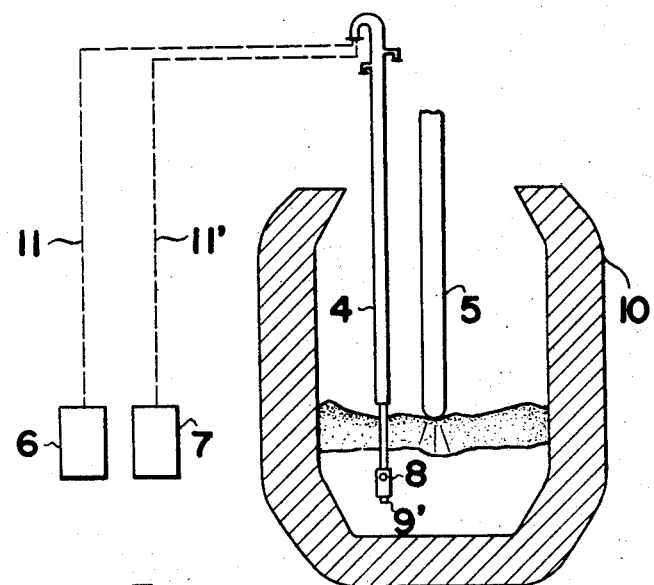
FIG. 2
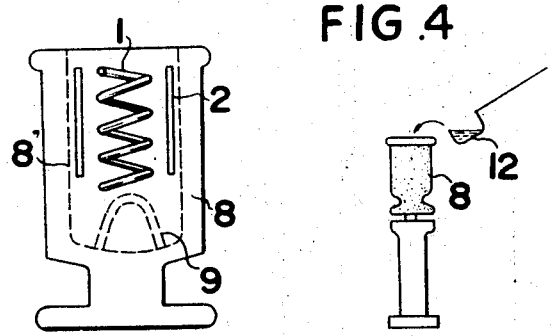
FIG. 3
FIG. 4

2781.0 °F
(C)=6.1×10⁻²
31 sec 2780.0°F
(C)=7.95×10⁻²
4 sec

METHOD OF RAPIDLY DETERMINING THE SOLIDUS LINE OF MOLTEN STEEL

CROSS REFERENCE TO RELATED APPLICATION

This application is a continuation-in-part of our co-pending patent application Ser. No. 880,338, filed Nov. 26, 1969 now abandoned, and this application also constitutes an improvement over our method of determining the carbon content in molten steel described in application Ser. No. 815,955, filed on Apr. 14, 1969 now U.S. Pat. No. 3,572,124.

BACKGROUND OF THE INVENTION

The present invention relates to a method for the rapid determination of the solidus line of molten steel, so that from this solidus line it is possible to determine the carbon content of the steel in a well known manner.

In the above application Ser. No. 815,955, a method is described for determining the carbon content of molten steel by heat measurement of a sample of molten steel poured into a sampling vessel and plotting the solidus line therefrom. The sampling vessel is described as a carbon determinator. The accuracy of this method depends upon an exact and rapid determination of the solidification temperature. However, there is generally apt to be a delay in obtaining a correct solidifying temperature when the liquid steel is run into the sampling vessel. Moreover, molten steel at high temperature damages the quartz tube which is used to protect the thermal-analyzing means (thermocouple), and this leads to instability and some slight inaccuracy in determining the solidification temperature, which of course results in an inaccuracy in determining the carbon content.

In order to avoid this, the optimum temperature of the molten steel poured into the sampling vessel is generally preferred to be about 30°C to 50°C higher than the solidification point. The temperature of the molten steel can be determined with ease by taking the same at proper intervals, prior to pouring it into the sampling vessel, by a spoon or ladle at the front of the furnace, e.g. an open hearth furnace, and determining the temperature thereof. However, this procedure requires some time, which is sufficient to exert a harmful influence upon the rapid refining and blowing operations, e.g. in a B.O.F. process. It is of course quite clear that the more rapidly the measurement of the carbon content is determined, the better the overall manufacturing process.

It is already known to introduce molten steel into a chamber so as to be cooled only by the wall of the chamber. However, the result is that the cooling capacity of such a chamber is limited. The molten steel in the vicinity of the wall of the chamber is cooled rapidly while the molten steel at the center of the chamber is cooled slowly. As a result a precise measurement of the solidification temperature cannot be carried out.

Also, there are known methods according to which bodies are dissolved in a sample of molten steel during solidification of the latter, but such bodies are used exclusively as a deoxidizing means. Thus, such bodies will be made of aluminum and when reacting with the oxygen in the molten steel heat is generated so as to retard the rate of cooling because of the deoxidation reaction. Thus, with such arrangements also it is not possible to obtain cooling of desired rapidity which will give a clear indication of the solidification temperature.

SUMMARY OF THE INVENTION

It is thus a general object of the present invention to avoid the time lag necessarily inherent in previously known methods for determining the solidification temperature of molten steel.

It is accordingly a primary object of the present invention to provide a stable and rapid method for determining the solidus line of molten steel.

More particularly it is an object of the invention to provide a method capable of achieving the rapid cooling of molten steel in a sampling chamber while the temperature of the molten steel is measured so that the solidus line can be quickly obtained in order to derive from the latter the carbon content of the molten steel.

A further object of the present invention is to provide a method of the above type which is capable of achieving a substantially uniform cooling throughout the body of the molten steel so as to enhance the precision of the measurements.

In addition it is an object of the invention to provide a method which is capable of cooling the steel sample in such a way that the temperature thereof sharply drops down to a temperature which is nearly the solidification temperature, and then the rate at which the temperature drops rapidly falls off so that a much slower cooling takes place.

According to the method of the invention for the rapid determination of the carbon content of molten steel by determination of the solidus line of the molten steel, a molten steel sample is introduced from a molten steel bath into a chamber of a measuring unit. However, before this step of introducing the molten steel into the chamber is carried out, there is situated within the chamber a material composed of free metallic bodies which have the property of melting in molten steel without any exothermic reaction, so that this material will simply act to reduce the temperature of the molten steel without generating any heat due to any chemical reactions or the like, and the quantity of this material is selected in such a way that the temperature of the molten steel introduced into the chamber which initially is provided with this material will sharply fall off until almost the solidification temperature is reached with all of the material preliminarily situated in the chamber being fully melted within and absorbed within the molten steel at this time when the molten steel has almost reached the solidification temperature. Then the molten steel is permitted to continue to cool and solidify. During the time when the molten steel is in the chamber, cooling therein, the temperature of the molten steel is continuously recorded so as to provide in this way a curve which will sharply indicate the solidification temperature, and with the entire cooling operation taking place very rapidly so that an extremely precise temperature indication is achieved.

BRIEF DESCRIPTION OF DRAWINGS

The invention is illustrated by way of example in the accompanying drawings which form part of this application and in which:

FIG. 2 is a schematic representation illustrating how the structure of FIG. 1 is used with a basic oxygen furnace;

FIG. 3 is a schematic elevation of a sampling vessel which can be situated outside of a furnace adjacent thereto;

FIG. 4 schematically represents how steel is poured into the vessel of FIG. 3;

DESCRIPTION OF PREFERRED EMBODIMENTS

Figure 1:
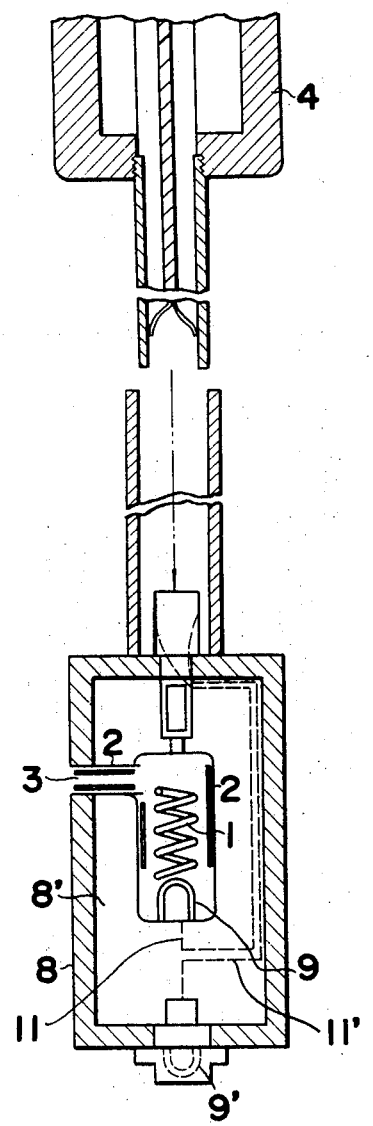
FIG. 1 is a fragmentary schematic sectional elevation of a sampling vessel carried by the lower end of an auxiliary lane.

Referring now to FIGS. 1 and 2, in the case where blowing is carried out by way of a lance 5 in connection with a bath of molten metal in a BOF vessel 10, an auxiliary lance 4 is introduced into the furnace 10, extending parallel to the lance 5. At its lower end the auxiliary lance is provided with a sampling vessel 8 which forms part of the measuring unit. This vessel 8 is provided at one side, as shown in FIG. 1, with an aperture 3 through which molten steel in the furnace flows into the sampling chamber of the vessel 8.

In accordance with the method of the present invention, there is preliminarily situated within the chamber 8' of the vessel 8 a predetermined amount and type of material composed of bodies of metallic cooling agents 1 and 2. These agents are first dispersed in the chamber 8', so that when molten steel flows into the chamber the temperature of the molten steel is rapidly lowered almost to its solidification point by the rapid melting of the cooling agents 1 and 2 which are absorbed into the molten steel. The metallic material used for the cooling agents 1 and 2 can take the form of any metal which will rapidly melt without generating heat upon contact of the cooling agents with the molten metal. Thus, it is possible to use for this purpose bodies of steel, copper, brass, or other metals which will melt in the molten steel to cool the latter without any exothermic reaction. While the bodies which form the cooling agents 1 and 2 may take any shape whatsoever such as the shape of spirals, granulated bodies, etc., it is preferred to use for the cooling agent material in the form of wire, sheet form, or in the form of granulated particles, with this material preferably being composed of soft iron or mild steel having a carbon content which is less than 0.20 percent. This cooling agent is uniformly distributed in the chamber 8' prior to introduction of the molten metal into this chamber, and the amount of cooling agent which is preliminarily situated in the chamber of the measuring unit to act as a cooling agent is an amount on the order of 0.5–5.0 percent by weight of the molten steel sample which is subsequently received in the chamber. The amount of cooling agent which is first situated in the chamber is determined in accordance with the state of the overheated molten steel. The amount is such that all of the cooling agent is entirely melted in the molten steel while the temperature of the latter rapidly drops until almost the solidification point is reached.

The carbon content can be determined with a high degree of accuracy by determining the solidus line in a period of only a few seconds. Thus, the carbon content of the steel is measured by thermal analysis by means of a thermocouple 9 (FIG. 1) which measures the temperature of the solidifying steel in the sample vessel. In the case of FIGS. 1 and 2 where the sample vessel is situated directly within the bath in the furnace 10, the vessel 8 also carries at its bottom end a second thermocouple 9' used for obtaining measurement of the bath temperature to supply data for the operation of the furnace. Thus, this second thermocouple 9' is illustrated solely as a matter of convenience for determining information with respect to the bath which is in the furnace 10, but has nothing to do with the present invention.

FIGS. 3 and 4 schematically illustrate another embodiment of the method of the invention according to which it is possible to carry out the measurement in a vessel which is situated at the exterior of the furnace, this embodiment being capable of use with a furnace such as an open hearth furnace, for example. As is illustrated in FIG. 3, the solid bodies 1 and 2 which form the cooling agent as set forth above are first situated within the sampling chamber 8', and then liquid steel is poured by means of a spoon or ladle 12 into the vessel 8, as illustrated in FIG. 4. This ladle 12 will take some of the molten steel from the bath within the furnace and this molten steel is then poured into the vessel 8 as shown in FIG. 4. It will be noted from FIG. 3 that the vessel 8 also has the thermocouple 9 which measures the temperature of the steel during the cooling thereof.

With both of the above embodiments the temperature of the steel and the carbon content thereof are determined by way of recorders 6 and 7 which are activated through compensating lead wires 11 and 11', respectively.

Figure 5:
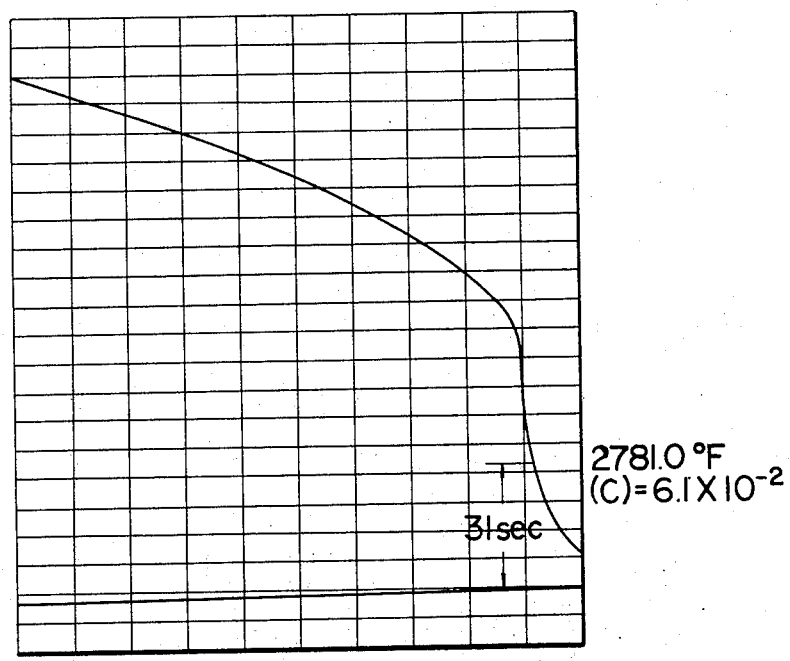
FIG. 5 is a graph showing the results of measurements obtained by the method of the above application Ser. No. 815,955.

FIG. 5 shows results achieved by measuring according to the method of the above U.S. patent application Ser. No. 815,955. In this latter method, as shown in FIG. 5, an interval of 31 seconds was required to measure the carbon content of the steel, and FIG. 5 shows the graph resulting from the measurement. As is apparent from FIG. 5 the curve slopes gradually and gently so that there is no sharp indication of the solidifying point which is difficult to determine from the curve of FIG. 5. With this arrangement since the measuring time is undesirably long, the quartz tube used to protect the thermocouple 9 may be damaged and the solidifying point of the steel becomes unstable.

Figure 6:
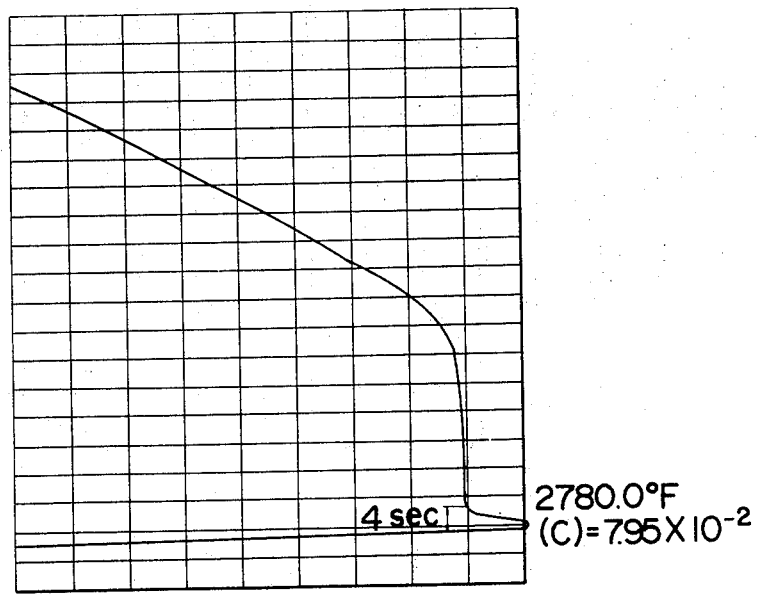
FIG. 6 is a graph showing results of measurements obtained according to the method of the present invention.

FIG. 6 shows the results of measurements made in accordance with the method of the invention. As is apparent from FIG. 6 just prior to complete melting of the cooling agent in the molten steel when the solidifying point has almost been reached the temperature of the molten steel falls off very sharply. Then the molten steel is permitted to continue to cool through the solidifying zone. As is apparent from FIG. 6 in the particular example illustrated only 4 seconds are required to pass through the region of solidification and the point of solidification is clearly and sharply apparent from FIG. 6, enabling the solidifying temperature of the molten steel in the chamber to be determined with a high degree of accuracy.

As is apparent from the above description, the method of the present invention makes it possible to measure the carbon content in a steel bath during an interval of only a relatively few seconds and with a high degree of accuracy. Accordingly, the method of the invention provides accurate data with respect to the temperature and carbon content of the steel bath in a short time interval so as to permit the blowing operations to be greatly improved, thus providing high productivity and excellent quality of the final product. According to the method of the invention a cooling agent which easily melts is supplied preliminarily to the measuring device. When molten steel is fed to the measuring device the cooling agent rapidly melts into the molten steel to rapidly cool the same nearly to the solidification temperature of the molten steel. Then the molten steel is cooled naturally to the solidification temperature. The solidification temperature of the molten steel is precisely determined by way of a thermocouple or pyrometer situated within the measuring device. The cooling agents which do not react chemically with the molten steel physically melt into the latter so as to absorb heat therefrom. Thus, with the invention a soluble cooling agent is preliminarily inserted uniformly into the chamber of the measuring unit, and the amount of cooling agent is controlled in accordance with the condition of the overheated molten steel so as to cool the entire chamber uniformly. In this way measurement of the solidification temperature of the molten steel is precisely carried out.

While an interval of 4 seconds has been referred to above in connection with the example illustrated in FIG. 6, this interval may vary somewhat involving, for example, several seconds in accordance with the condition of the overheated molten steel, the amount of cooling agent added, the demand for precision in the measurement, etc.

What is claimed is:

1. Method for the rapid determination of the carbon content of molten steel by determination of the solidus line of said molten steel, which comprises the steps of introducing a molten steel sample from a molten steel bath into a chamber of a measuring unit after first situating in said chamber, prior to introduction of molten steel into the latter, a cooling agent in the form of material composed of free metallic bodies which have the property of melting in the molten steel to absorb heat therefrom without reacting with the molten steel or oxygen therein to generate heat, said cooling agent being initially introduced into said chamber in an amount sufficient to provide a rapid drop in the temperature of the molten steel down to almost the solidification temperature thereof when the material forming the cooling agent is completely melted into and absorbed within the molten steel after which the molten steel continues to cool through the solidification region with the cooling agent completely melted therein, and measuring the temperature of the molten steel sample in the chamber as the sample cools and solidifies, whereby the solidus line of the steel can be plotted to provide a determination of the carbon content of the steel.

2. Method as recited in claim 1 and wherein the free bodies which form the material of the cooling agent are made of a material such as steel, copper, brass, or the like, which is capable of melting in the molten steel without any exothermic reaction.

3. Method as recited in claim 1 and wherein the material forming the cooling agent is mild steel having a predetermined carbon content which is less than 0.20 percent and supplied uniformly in said chamber in an amount of 0.5–5.0 percent by weight of the molten steel sample.

4. Method as recited in claim 3 and wherein the mild steel bodies have a form such as wire, sheet, or granular particles.

5. Method according to claim 1 in which the chamber containing the metallic bodies is introduced into the molten steel bath during refining thereof with molten steel of the bath entering into the chamber which contains the metallic bodies.

6. Method according to claim 1 wherein a sample of molten steel is taken from a molten steel bath in a furnace and introduced into said chamber which contains said metallic bodies.

* * * * *